UNITED STATES PATENT OFFICE.

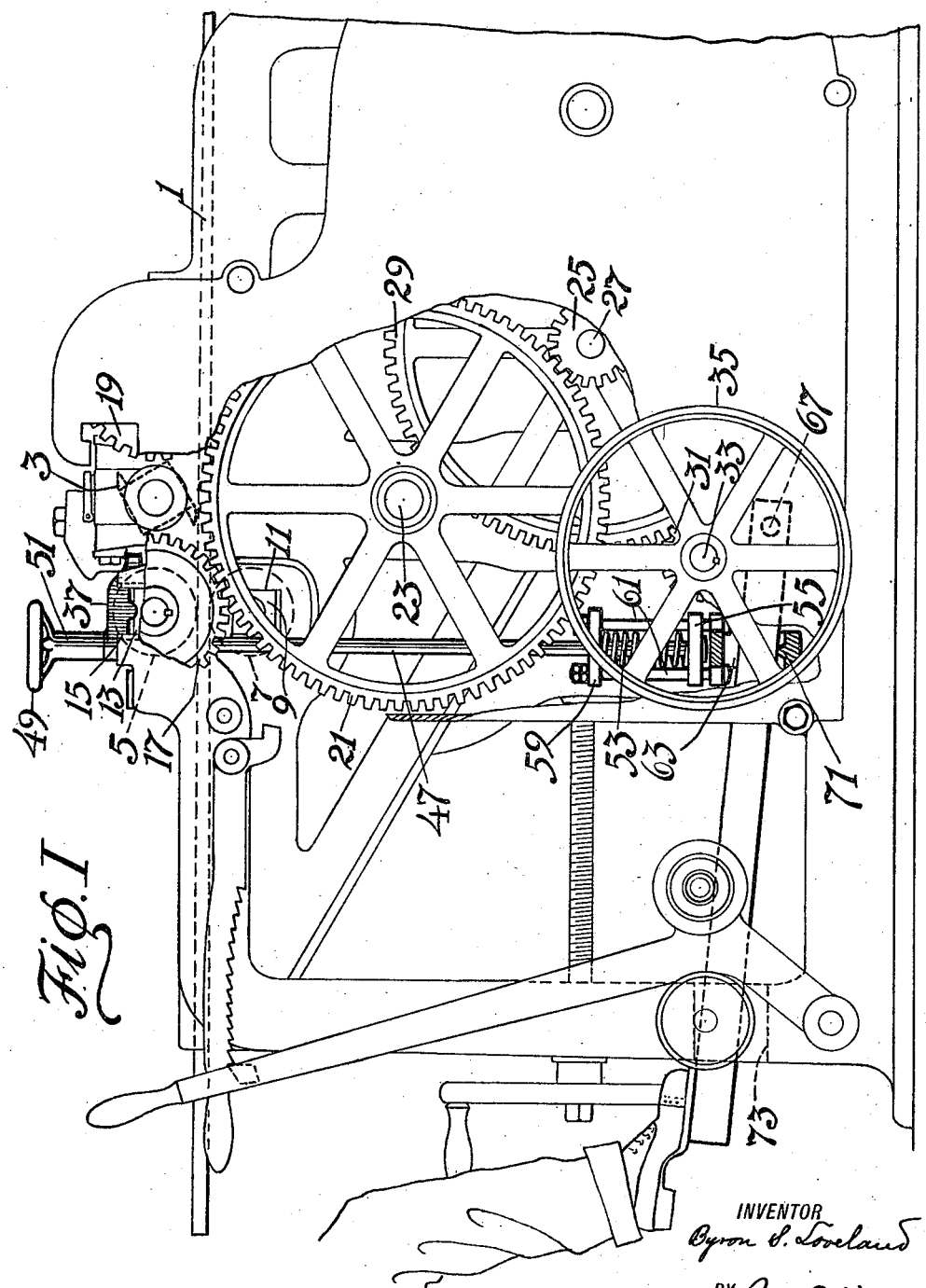

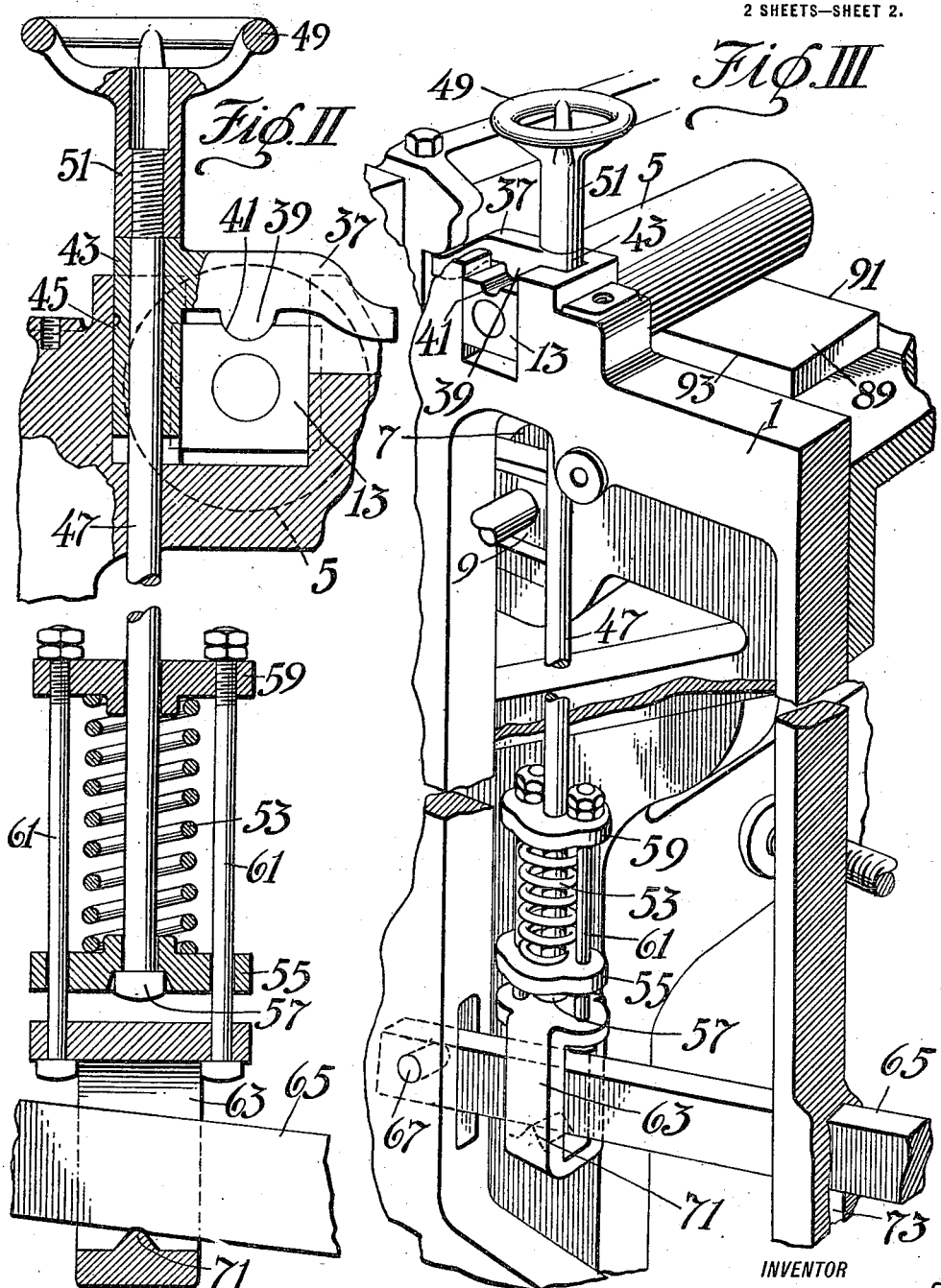

BYRON S. LOVELAND, OF WINCHENDON, MASSACHUSETTS, ASSIGNOR TO WILLIAM M. WHITNEY, OF WINCHENDON, MASSACHUSETTS.

WOOD-PLANING MACHINE.

1,275,167.

Specification of Letters Patent.

Patented Aug. 6, 1918.

Application filed December 10, 1917. Serial No. 206,387.

*To all whom it may concern:*

Be it known that I, BYRON S. LOVELAND, a citizen of the United States, residing at Winchendon, county of Worcester, and State of Massachusetts, have invented an Improvement in Wood-Planing Machines, of which the following description, in connection with the accompanying drawings, is a specification, like characters on the drawings representing like parts.

The invention hereinafter described relates to wood planing and other machines, and among other objects provides means whereby the pressure at either end of a feed roll may be varied, in order to properly feed the work through the machine.

For example, it frequently happens that a plank to be planed will have greater thickness at one longitudinal margin than at the other. Consequently, the cutter will be obliged to make a greater depth of cut in the margin of greater thickness and will offer greater resistance to the feed thereof than the margin of less thickness. As a result, the plank may tend to skew and become diverted from its proper direction of feed through the machine. The present invention, among other objects, provides simple and effective means whereby the pressure of the rolls on the margin of greater thickness may be readily increased to compensate for the work of making the greater depth of cut therein. The construction is such that the pressure of the rolls on the margins may be easily and promptly varied to cause the plank or other work to be fed properly through the machine.

The character of the invention may be best understood by reference to the following description of one good form of the invention shown in the accompanying drawings, wherein:—

Figure 1 is a side elevation of a machine embodying the invention, certain parts being broken away more clearly to disclose the construction;

Fig. 2 on an enlarged scale, is a vertical section through the means for exerting the pressure on the feed roll;

Fig. 3 is a perspective view of said means and certain parts of the machine coöperating therewith.

Referring to the drawings:—The machine shown therein as embodying the invention comprises the frame 1 having the usual cutter 3 mounted thereon and driven by suitable driving mechanism in the usual manner.

To feed the work through the machine, a pair of upper and lower in-feed rolls 5 and 7 are provided, the latter being journaled in bearing boxes 9 mounted in vertical guideways 11 in the machine frame in the usual manner. The upper feed roll is journaled in bearing boxes 13 adapted to slide in vertical guideways 15 in the machine frame.

A pair of usual out-feed rolls (not shown) may be provided at the opposite side of the cutter.

To rotate said feed rolls, they may be provided with gears 17 and 19 meshing with and driven by a large gear 21 on a shaft 23 journaled in bearings in the machine frame, said large gear being driven by a pinion 25 on a shaft 27 journaled in bearings in the machine frame. A large gear 29 fast on the shaft 27 is driven by a pinion 31 fast on a shaft 33 journaled in bearings in the machine frame. This shaft may be driven by a pulley 35.

To press the upper in-feed roll toward its companion roll, devices are provided adjacent the opposite ends of said roll, and since these devices are similar in construction, a description of one will suffice for both.

Each of these devices comprises an arm 37 extending over and transversely of the bearing box for the roll and having a projection 39 engaging a depression 41 in the bearing box. This arm is fast on a sleeve 43 mounted in a recess 45 in the machine frame adjacent the bearing box. To draw the arm downward, a vertical rod 47 is provided extending through said sleeve and upward somewhat beyond the same to receive a hand wheel 49 having a hub 51 threaded on said rod and adapted to engage the upper end of said sleeve. This hand wheel will not only serve to cause the sleeve to move downward with the rod, but also to vary the pressure on the roll, and it may be readily released from the rod to permit removal of said sleeve from the rod and enable the upper roll box to be slid upward out of its guideway as more fully hereinafter described.

Spring means is provided for drawing the rod downward to press the upper roll toward its companion roll, and in the present instance of the invention is in the form of a helical spring 53 encircling said rod. One end of this spring engages a collar 55 on said rod limited by a head 57 at the lower end of said rod, and the other end of the spring engages a collar 59 loose on and adapted to slide along the rod.

To draw this collar downward, bolts 61 are entered through registering apertures in the collars and in a yoke 63 beneath the lower end of the rod.

A lever 65 pivoted on a pin 67 on the machine frame projects through this yoke toward the front of the machine, where it presents a treadle 69 adapted to be depressed by the foot of the operator as more fully hereinafter described. This lever may rock on a fulcrum 71 projecting upward from the bottom of the yoke.

The helical spring will react through the upper collar, the bolts and the yoke, and tend to rock the foot lever upward. To limit such movement of said lever, a suitable stop may be provided, in the present instance of the invention in the form of the upper end of a slot 73 in the machine frame.

The spring will normally exert a pressure which will tend to force the upper feed roll down toward its companion roll. In accomplishing this, it reacts from the upper collar above it downward against the lower collar, which in turn presses against the head of the rod and draws the latter downward, thereby causing the sleeve and arm on the rod to press on the bearing box of the roll.

To illustrate the use of the construction described, it may be supposed, for example, that a plank 89 (Fig. 3) is being fed through the machine, of a greater thickness at its longitudinal margin 91 than at its longitudinal margin 93, or, in other words, is of wedge-shape transverse section.

Hence, the cutter will be obliged to make a greater depth of cut in the thicker margin 91 than in the thinner margin 93. Consequently, it will require more work to feed the margin 91 than the margin 93 and the pressure of the rolls on the former must be greater than on the latter, in order to prevent skewing of the plank.

Under these conditions, the operator quickly increases the pressure on the end of the roll adjacent its edge of greater thickness by depressing the foot lever at that side of the machine. This lever will pull the collar above the spring downward, thereby increasing the tension of the spring and the pressure on the bearing box at that end of the roll.

Similarly, if the opposite margin of the plank should be the thicker, the operator would merely need to press the foot lever at the opposite side of the machine in order to insure correct feed of the plank. The operator may readily observe the feed of the plank and gage the degree of pressure on the foot lever accordingly.

If the plank presents a greater thickness at one edge than the other, along merely a portion of the length of the plank, it is necessary merely for the operator to depress the appropriate foot lever to correct the feed for the period of time required for the feeding of such portion of the plank through the machine. As soon as a portion of the plank of uniform thickness commences to feed through the machine, the operator releases the pressure on the foot lever, and equal pressures on the bearing boxes at both ends of the feed roll are automatically resumed.

If it is desired to remove the upper feed roll and its bearing boxes for purposes of replacement or repair, it is necessary merely to unscrew the hand wheels from the tops of the spring-pressed rods, thereby permitting the arm sleeves to be slid from said rods and the roll and its bearing boxes to be lifted from their guideways.

To vary the normal tension of the springs, the hand wheels 49 may be adjusted on the rods 47 to vary the effective length thereof as desired.

It will be understood that the invention is not limited to the specific embodiment shown therein, but that extensive deviations may be made therefrom without departing from the spirit and scope of the appended claims.

What is claimed is:—

1. In a machine of the character described, the combination with a frame, of a cutter thereon, and means to feed work relatively to said cutter including a presser roll; bearing boxes for said roll slidably mounted on said frame, means for maintaining a normal pressure on said boxes, and means to apply abnormal pressure on either of said boxes at will to distribute the pressure to work of irregular form.

2. In a machine of the character described, the combination with a frame, of a cutter thereon, and means to feed the work relatively to said cutter including a presser roll; bearing boxes for said roll slidably mounted on said frame, means for maintaining a normal pressure on said boxes, and means including a foot lever to apply abnormal pressure on either of said boxes to distribute the pressure to work of irregular form.

3. In a machine of the character described, the combination with a frame, of a cutter thereon, and means to feed work relatively to said cutter including a presser roll; bearing boxes for said roll slidably mounted on said frame, treadles, and means connecting said treadles with said boxes, whereby the pressure may be increased on either end of said roll to distribute the pressure to work of irregular form.

4. In a machine of the character described, the combination with a frame, of a cutter thereon, and means to feed work relatively to said cutter, including a presser roll; means for applying a normal pressure to opposite ends of said roll, and manually operable means to increase the pressure on either end of said roll to distribute the pressure to work of irregular form.

5. In a machine of the character described, the combination with a frame, of a cutter thereon, and means to feed work relatively to said cutter, including a presser roll; manually operable levers adjacent the opposite sides of the frame, and connections between said levers and the ends of said roll, whereby the pressure on the ends of said roll may be varied at will.

6. In a machine of the character described, the combination with a frame, of a cutter thereon, and means to feed work relatively to said cutter, including a presser roll; manually operable levers adjacent opposite sides of said frame, and spring connections between said levers and the ends of said roll tending to draw said roll toward said levers.

7. In a machine of the character described, the combination with a frame, of a cutter thereon, and means to feed work relatively to said cutter, including a presser roll; manually operable levers adjacent opposite sides of said frame, stop means for limiting the movement of said levers, and spring means connecting said levers with said roll and tending to draw the latter toward the former.

8. In a machine of the character described, the combination with a frame, of a cutter thereon, and means to feed work relatively to said cutter, including a presser roll; manually operable levers adjacent opposite sides of said frame, stop means for limiting movement of said levers, rods connected to said roll, and springs connecting said rods with said levers for maintaining pressure on said roll.

9. In a machine of the character described, the combination with a frame, of a cutter thereon, and means to feed work relatively to said cutter, including a presser roll slidably mounted on said frame; manually operable levers adjacent opposite sides of said frame, and connections between said roll and levers detachably connected to said roll to readily permit removal of the latter from said frame.

10. In a machine of the character described, the combination with a frame, of a cutter thereon, and means to feed work relatively to said cutter, including a presser roll; bearing boxes for said roll slidably mounted on said frame, manually operable levers adjacent opposite sides of said frame, and connections between said levers and boxes including sleeves having arms overlying said boxes.

11. In a machine of the character described, the combination with a frame, of a cutter thereon, and means to feed work relatively to said cutter, including a presser roll; bearing boxes for said roll slidably mounted on said frame, manually operable levers, and means to transmit movement from said levers to said boxes including sleeves having arms overlying said boxes and rods extending through said sleeves toward said levers.

12. In a machine of the character described, the combination with a frame, of a cutter thereon, and means to feed work relatively to said cutter, including a presser roll; bearing boxes for said roll slidably mounted on said frame, manually operable members adjacent opposite sides of said frame, and means to transmit movement from said members to said boxes including sleeves having arms overlying said boxes, rods extending through said sleeves toward said members, coil springs encircling said rods, and means connecting said springs with said members.

13. In a machine of the character described, the combination with a frame, of a cutter thereon, and means to feed work relatively to said cutter including a presser roll; bearing boxes for said roll slidably mounted on said frame, manually operable members adjacent opposite sides of said frame, and means to transmit movement from said members to said boxes, including rods, collars on said rods, and coil springs confined between said collars.

14. In a machine of the character described, the combination with a frame, of a cutter thereon, and means to feed work relatively to said cutter, including a presser roll; bearing boxes for said roll slidably mounted on said frame, manually operable members, and means to transmit movement from said members to said boxes including rods, upper and lower collars on said rods, means to connect said upper collars with said members, and springs confined between said collars.

15. In a machine of the character described, the combination with a frame, of a cutter thereon, and means to feed work relatively to said cutter, including a presser roll; manually operable members, and means to transmit movement from said members to said roll including rods, springs, and hand wheels adjustable along said rods to vary the tension of said springs.

16. In a machine of the character described, the combination with a frame, of a cutter thereon, and means to feed work relatively to said cutter, including a presser roll; bearing boxes for said roll slidably mounted on said frame, manually operable members, and means to transmit movement from said members to said roll including rods, sleeves on said rods having arms overlying said boxes, and hand-wheel sleeves threaded on said rods for limiting movement of said first-named sleeves along said rods.

17. In a machine of the character described, the combination with a frame, of a cutter thereon, and means to feed work relatively to said cutter, including a presser roll; bearing boxes for said roll slidably mounted on said frame, manually operable members, and means to transmit movement from said members to said roll including rods, and sleeves on said rods having arms engaging said boxes, said sleeves being detachably connected to said rods.

In testimony whereof I have signed my name to this specification.

BYRON S. LOVELAND.

Copies of this patent may be obtained for five cents each, by addressing the "Commissioner of Patents, Washington, D. C."